United States Patent
Yoshioka et al.

(10) Patent No.: US 9,172,071 B2
(45) Date of Patent: Oct. 27, 2015

(54) BATTERY PACK AND ELECTRICALLY POWERED VEHICLE PROVIDED WITH SAME

(75) Inventors: Toshiki Yoshioka, Ritto (JP); Yukiko Yoshioka, legal representative, Kyoto (JP); Noritaka Yoshioka, legal representative, Kyoto (JP); Miki Yoshioka, legal representative, Kyoto (JP); Toshiki Kusunoki, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 405 days.

(21) Appl. No.: 13/823,086

(22) PCT Filed: Sep. 14, 2011

(86) PCT No.: PCT/JP2011/070952
§ 371 (c)(1),
(2), (4) Date: Mar. 13, 2013

(87) PCT Pub. No.: WO2012/036190
PCT Pub. Date: Mar. 22, 2012

(65) Prior Publication Data
US 2015/0171390 A1     Jun. 18, 2015

(30) Foreign Application Priority Data

Sep. 16, 2010   (JP) .................. 2010-207960

(51) Int. Cl.
*H01M 2/02*     (2006.01)
*H01M 2/04*     (2006.01)
(Continued)

(52) U.S. Cl.
CPC ......... *H01M 2/1083* (2013.01); *B60L 11/1879* (2013.01); *H01M 2220/20* (2013.01); *Y10S 903/907* (2013.01)

(58) Field of Classification Search
CPC ....................................... H01M 2/02
See application file for complete search history.

(56) References Cited

U.S. PATENT DOCUMENTS

| 6,227,322 | B1 | 5/2001 | Nishikawa |
| 8,372,530 | B2 | 2/2013 | Kubota et al. |

(Continued)

FOREIGN PATENT DOCUMENTS

| CA | 2642003 A1 | 9/2007 |
| CA | 2703685 A1 | 5/2009 |

(Continued)

OTHER PUBLICATIONS

Extended European Search Report dated Mar. 24, 2014.

(Continued)

*Primary Examiner* — Jacob Marks
(74) *Attorney, Agent, or Firm* — McGinn IP Law Group, PLLC.

(57) ABSTRACT

Provided is a battery pack that can securely prevent liquid, such as water and wash fluid, attached to an outer surface of a packaging case housing a plurality of electric cells from entering an internal space of the packaging case from between a tray and a cover and that also allows easily performing attachment and detachment work of the cover to and from the tray. The packaging case includes an edge cover for covering the whole circumference of a lower flange portion of the tray and an upper flange portion of the cover that abut each other. The edge cover includes a first section facing the lower flange portion, a second section facing the upper flange portion, and a connecting portion for connecting base ends of the first section and the second section. A plurality of female threaded portions are arranged on either the first section or the second section. Screw insertion holes for causing male screw members to be inserted according to the arrangement of the female threaded portions are arranged on either the first section or the second section in which the female threaded portions are not arranged, on the lower flange portion, and on the upper flange portion.

13 Claims, 5 Drawing Sheets

(51) Int. Cl.
      *H01M 2/10*     (2006.01)
      *B60L 11/18*    (2006.01)

(56) References Cited

U.S. PATENT DOCUMENTS

| | | | |
|---|---|---|---|
| 2008/0318119 A1* | 12/2008 | Watanabe et al. | 429/99 |
| 2009/0166116 A1 | 7/2009 | Kiya et al. | |
| 2010/0136402 A1 | 6/2010 | Hermann et al. | |
| 2010/0273040 A1 | 10/2010 | Kubota et al. | |
| 2010/0307848 A1 | 12/2010 | Hashimoto et al. | |

FOREIGN PATENT DOCUMENTS

| | | |
|---|---|---|
| CN | 101389501 A | 3/2009 |
| CN | 101868869 A | 10/2010 |
| DE | 102010022876 A1 | 1/2011 |
| EP | 1 852 925 A1 | 11/2007 |
| EP | 1992513 A1 | 11/2008 |
| EP | 2214225 A1 | 8/2010 |
| JP | 8-021518 A | 1/1996 |
| JP | 8-315854 A | 11/1996 |
| JP | 11-170874 A | 6/1999 |
| JP | 11-173424 A | 6/1999 |
| JP | 2001-114153 A | 4/2001 |
| JP | 2001-119801 A | 4/2001 |
| JP | 2002-157984 A | 5/2002 |
| JP | 2002-164028 (A) | 6/2002 |
| JP | 2003-297306 A | 10/2003 |
| JP | 2007-253933 A | 10/2007 |
| JP | 2009-146881 A | 7/2009 |
| JP | 2010-033796 A | 2/2010 |
| JP | 2010-284984 A | 12/2010 |
| KR | 10-2010-0071100 A | 6/2010 |
| TW | 200936406 A | 9/2009 |
| WO | WO 2006/090904 A1 | 8/2006 |
| WO | WO2007/100072 A1 | 9/2007 |
| WO | WO2009/066661 A1 | 5/2009 |

OTHER PUBLICATIONS

International Search Report in PCT/JP2011/070952 dated Dec. 20, 2011(English Translation Thereof).

* cited by examiner

BATTERY PACK AND ELECTRICALLY POWERED VEHICLE PROVIDED WITH SAME

TECHNICAL FIELD

The present invention relates to a battery pack mounted on a hybrid electric vehicle (HEV) or an electric vehicle (EV). The present invention also relates to an electrically powered vehicle provided with this battery pack.

BACKGROUND ART

In recent years, from the viewpoint of environmental protection, a hybrid electric vehicle with small $CO_2$ emissions and an electric vehicle that does not emit $CO_2$ (hereinafter collectively referred to as an electrically powered vehicle) have come into widespread use. A battery pack is mounted on this electrically powered vehicle as an energy supply source that supplies energy to a driving motor and other electric systems.

The battery pack is provided with a plurality of cell modules and a packaging case housing the plurality of cell modules.

Each of the cell modules is such that a plurality of electric cells are electrically connected as one package. That is, each of the cell modules is an assembled battery formed of a plurality of electric cells.

The packaging case is provided with a tray on which cell modules are arranged and a cover that covers the cell modules on the tray. For example, the tray includes a bottom portion on which a plurality of cell modules are arranged in a matrix shape in planar view (in a condition in which a plurality of cell modules are arrayed lengthwise and crosswise in planar view), a lower circumferential wall portion which rises from the outer circumference of the bottom portion, and a lower flange portion which extends outward from the upper end of the lower circumferential wall portion. The cover includes a top portion having a shape corresponding to an open portion of the tray, an upper circumferential wall portion which suspends from the outer circumference of the top portion, and an upper flange portion which extends outward from the lower end of the upper circumferential wall portion.

And the cover covers the open portion of the tray including the plurality of cell modules arranged on the bottom portion, bolts are inserted to the lower flange portion and the upper flange portion that abut each other, nuts are screwed to the bolts, and the tray and the cover are fastened. As a result of this, the lower flange portion of the tray and the upper flange portion of the cover come into surface contact with each other, and the internal space of the packaging case for housing the cell modules becomes liquid-tight.

This battery pack is mounted to a bottom portion of an electrically powered vehicle. That is, because the weight and size of the whole battery pack mounted on an electrically powered vehicle becomes very large due to the necessity of securing electrical capacity, from the viewpoints of driving stability, arrangement of other components and the like, this battery pack is arranged in the bottom portion of an electrically powered vehicle (cf., Patent Document 1, for example).

Incidentally, as described above, since the battery pack mounted on the electrically powered vehicle is arranged on the bottom portion of the vehicle, moisture or water easily attaches to the outer surface of the packaging case due to car washing or splashing of water during driving. For this reason, the liquid-tightness between the tray and the cover (between the lower flange portion and the upper flange portion) needs to be sufficiently secured. However, in the conventional battery pack, the lower flange portion and the upper flange portion are caused to come into surface contact with each other to make the internal space of the packaging case liquid-tight. For this reason, when the pressure of the liquid on the packaging case is high, moisture or water may enter the internal space of the packaging case from between the lower flange portion and the upper flange portion.

For example, a high-pressure washer that ejects water or a liquid detergent (hereinafter, referred to as wash fluid) is used in some cases for car washing or maintenance. When high-pressure wash fluid is sprayed to the underbody of the electrically powered vehicle or the bottom of the car body, the wash fluid may enter the internal space of the packaging case from between the lower flange portion and the upper flange portion, and the wash fluid may cause short circuits and the like to damage the entire cell modules or the electric cells.

In addition to the above problem, the conventional battery pack also has a problem that attachment and detachment work of the cover associated with the inspection or replacement of the cell modules or the electric cells is troublesome. That is, bolts and nuts are used to fasten the tray and the cover in the conventional battery pack. The nuts need to be supplied to a plurality of portions (a plurality of fastening positions set around the tray and the cover) to fasten the tray and the cover, and the nuts arranged on the plurality of portions need to be recovered to remove the cover from the tray. Therefore, the conventional battery pack has a problem that very troublesome work needs to be performed when the cover is attached or detached in association with the inspection or replacement of the cell modules and the like.

CITATION LIST

Patent Document

Patent Document 1: Japanese Patent Application Laid-Open No. 2007-253933

SUMMARY OF INVENTION

Problems to be Solved by the Invention

Therefore, in view of this situation, an object of the present invention is to provide a battery pack and an electrically powered vehicle including the battery pack that can securely prevent liquid, such as water and wash fluid, attached to an outer surface of a packaging case including a tray and a cover from entering an internal space of the packaging case from between the tray and the cover and that can also eliminate troublesome attaching and detaching work of the cover to and from the tray.

Means for Solving Problems

The present invention provides a battery pack including:
one or more electric cells; and
a packaging case that houses the one or more electric cells, the packaging case including:
a tray on which the electric cells are arranged, the tray having a lower flange portion;
a cover that covers the electric cells on the tray, the cover having an upper flange portion, the lower flange portion and the upper flange portion that abut each other with the electric cells on the tray covered with the cover; and an edge cover that covers, from outside, the whole circumference or substantially the whole circumference of the lower flange portion and the upper flange portion abutting each other, the edge cover including:
a first section facing the lower flange portion;
a second section flange portion the upper flange portion; and
a connecting portion for connecting base ends of the first section and the second section, wherein
a plurality of female threaded portions are arranged on either the first section or the second section, and
screw insertion holes for causing male screw members to be inserted according to the arrangement of the female threaded portions are arranged on either the first section or the second section in which the female threaded portions are not arranged, on the lower flange portion, and on the upper flange portion.

Another embodiment of the present invention may have a configuration in which: nuts are fixed onto an outer surface of either of the first section or the second section on the side opposite to a surface which faces the lower flange portion or the upper flange portion and the plurality of female threaded portions are each formed by a threaded hole of each of the nuts.

Another aspect of the present invention may have a configuration in which: a sealing agent is interposed between the lower flange portion and the upper flange portion.

Still another embodiment of the present invention may have a configuration in which: the plurality of female threaded portions each are formed in the form of a non-through hole in such a manner as to be blocked on the side opposite to a surface of either the first section or the second section which faces the lower flange portion or the upper flange portion.

Yet another aspect of the present invention may have a configuration in which the lower flange portion and the upper flange portion are in the shape of an angular frame in planar view, and the edge cover is divided into a separate piece that covers side parts of the lower flange portion and the upper flange portion and a separate piece that covers corner portions of the lower flange portion and the upper flange portion.

In this case, adjacent separate pieces among the separate pieces may be arranged so that end portions are close to each other or abut each other.

Furthermore, the adjacent separate pieces may be arranged so that the first section and the second section of one of the separate pieces cover end portions of the first section and the second section of the other separate piece from outside.

In a further concrete embodiment of the present invention, the packaging case may be configured to be capable of being mounted to a bottom portion of an electrically powered vehicle or may be mounted thereto.

Furthermore, the electrically powered vehicle of the present invention is provided with any one of the above-described battery packs.

BRIEF DESCRIPTION OF DRAWINGS

FIGS. 4(a) and 4(b) are partial enlarged sectional views of the battery pack of this embodiment; FIG. 4(a) showing an enlarged sectional view of the area of a lower flange portion and an upper flange portion held in abutment with each other which is covered with an edge cover (only a first separate piece or a second separate piece), and FIG. 4(b) showing an enlarged sectional view of the area of an edge cover (a first separate piece or a second separate piece) covering a lower flange portion and an upper flange portion that abut each other, on which another edge cover (a third separate piece) is placed;

FIGS. 5(a) and 5(b) are explanatory sectional views related to the liquid-tightness of the battery pack of this embodiment; FIG. 5(a) showing how the area of a lower flange portion and an upper flange portion that abut each other, which is covered with an edge cover (only a first separate piece or a second separate piece), is being sprayed with a high-pressure liquid (a cleaning liquid), and FIG. 5(b) showing how the area of an edge cover (a first separate piece or a second separate piece) covering a lower flange portion and an upper flange portion that abut each other, on which another edge cover (a third separate piece) is placed, is being sprayed with a high-pressure liquid (a cleaning liquid); and

DESCRIPTION OF EMBODIMENT

Hereinafter a battery pack of an embodiment of the present invention will be described with reference to the accompanying drawings.

Figure 1:
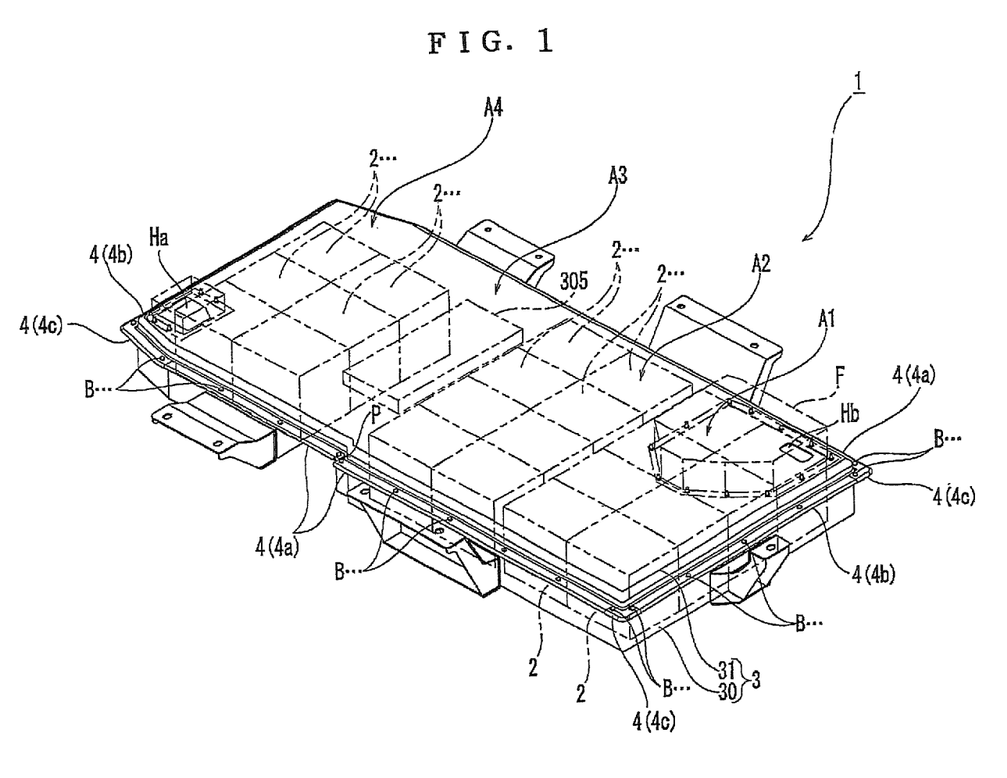
FIG. 1 is a general perspective view of a battery pack according to an embodiment of the present invention.
Figure 2:
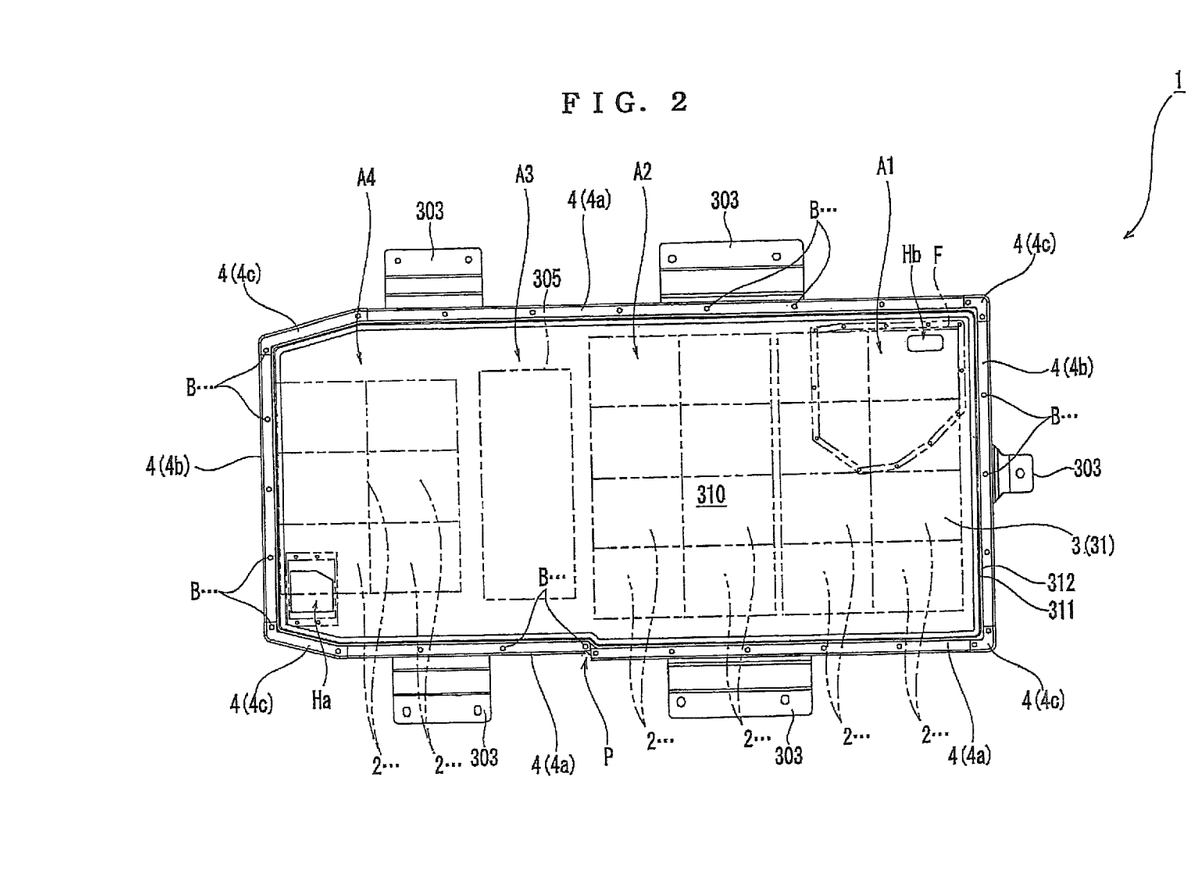
FIG. 2 is a general plan view of the battery pack of this embodiment.
Figure 3:
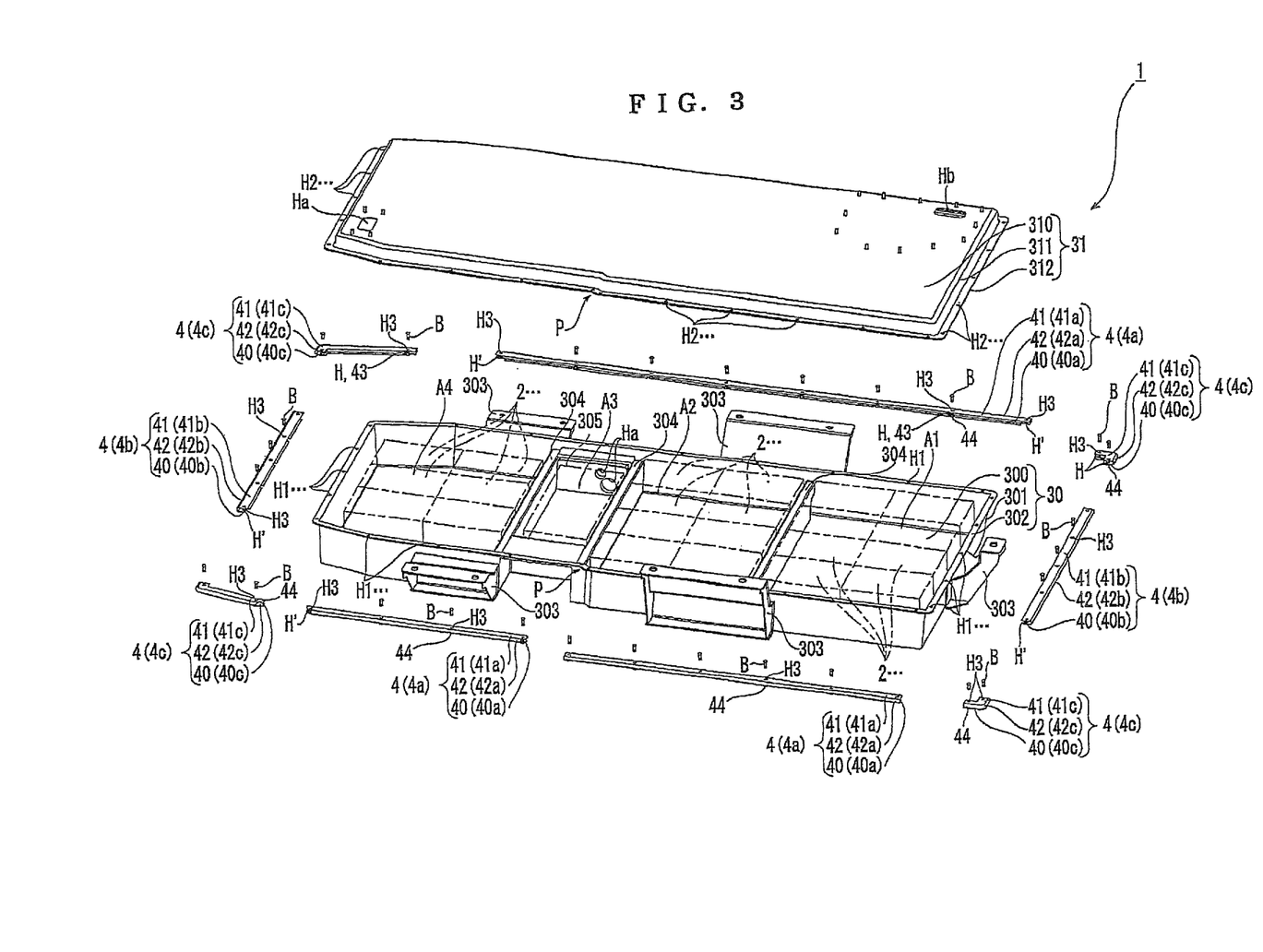
FIG. 3 is an exploded perspective view of the battery pack of this embodiment in which a cooling fan is not shown.

The battery pack 1 is intended to be mounted on an electric vehicle (EV) which is an electrically powered vehicle, and as shown in FIGS. 1 to 3, the battery pack 1 is provided with a plurality of cell modules 2, . . . and a packaging case 3 that houses the cell modules 2, . . . . Since the battery pack 1 of the present embodiment is characterized by the packaging case 3 and an edge cover 4 described later, the cell modules 2, . . . are simplified and indicated by alternate long and two short dashes lines in the drawings.

Each of the cell modules 2, . . . is what is called an assembled battery in which a plurality of electric cells are arranged in a line and packaged. In each of the cell modules 2, . . . , a plurality of electric cells are electrically connected to each other and the plurality of electric cells constitute a large-capacity battery.

The packaging case 3 is provided with a tray 30 on which the cell modules 2, . . . are arranged and a cover 31 that covers the upper part of the tray 30, more particularly, the modules 2, . . . on the tray 30.

As shown in FIG. 3, the tray 30 is provided with a lower flange portion 302. That is, the tray 30 is provided with a bottom portion 300 on which the cell modules 2, . . . are arranged (placed), and the above-described lower flange portion 302 that is directly or indirectly connected to the outer circumference of the bottom portion 300 and forms the shape of an annulus outside the bottom portion 300. More specifically, the tray 30 is provided with the above-described bottom portion 300, a lower circumferential wall portion 301 that rises from the outer circumference of the bottom portion 300, and the above-described lower flange portion 302 that extends outward from the upper end of the lower circumferential wall portion 301.

The bottom portion 300 is formed in a roughly rectangular shape in planar view. As a result of this, the lower circumferential wall portion 301 is formed in the shape of an angular frame in such a manner as to define the region that forms a rectangular shape in planar view in such a manner as to correspond to the planar shape of the bottom portion 300. Because the battery pack 1 is mounted on an electrically powered vehicle as described above, in each of a plurality of places on the outer surface of the lower circumferential wall portion 301 (in five places in this embodiment), a connecting arms 303, . . . is placed in a protruding manner for connection to a chassis (not shown).

In the tray 30, a region enclosed by the lower circumferential wall portion 301 is partitioned into a plurality of (four in the drawings) regions A1, A2, A3, and A4 in the longitudinal direction of the bottom portion 300. That is, the tray 30 is provided with a plurality of partitions 304, . . . that are spaced in the longitudinal direction of the bottom portion 300.

As described above, the lower circumferential wall portion 301 is formed in the shape of an angular frame in such a manner as to define the region that forms a rectangular shape in planar view. For this reason, each of the partitions 304, . . . is connected to a pair of positions of the lower circumferential wall portion 301 that are opposed to each other (not numbered).

In the tray 30, controller 305 (a control board) that controls the charge and the like of the cell modules 2, . . . , and others, are housed in the region A3, one of the regions A1, A2, A3, and A4 partitioned by the partitions 304, . . . , and the plurality of cell modules 2, . . . are arranged in the remaining regions A1, A2, and A4 in a matrix shape in planar view (in a condition in which a plurality of cell modules are arrayed lengthwise and crosswise in planar view).

In the tray 30, a connector (not shown) that connects a cable for supplying the power from the cell modules 2, . . . to a driving motor and a control system of an electric vehicle and a connector (not shown) that connects a cable for signal transmission of information (a charge condition and the like) on the cell modules 2, . . . and the electric cells, etc. are attached to the lower circumferential wall portion 301. For this reason, in the part of the lower circumferential wall portion 301 that defines the region A3 housing the controller 305, there is formed a connector through hole Ha through which a connector is attached (not shown).

The lower flange portion 302 extends outward from the whole circumference of the upper end of the lower circumferential wall portion 301. As a result of this, the lower flange portion 302 provides an endless annulus. Because the bottom portion 300 is formed in the shape of a quadrangle in planar view, the lower flange portion 302 provides a frame that is angular in planar view. In the lower flange portion 302, there are formed a plurality of screw insertion holes H1, . . . through each of which a male screw member B is to be inserted. In the lower flange portion 302, a plurality of screw insertion holes H1 for insertion of the male screw member B are formed circumferentially at prescribed intervals.

The cover 31 is provided with the above-described upper flange portion 312. That is, the cover 31 is provided with a top portion 310 having a shape corresponding to the open part of the tray 30, and the above-described upper flange portion 312 that is connected directly or indirectly to the outer circumference of the top portion 310 and forms the shape of an annulus outside the top portion 310. More specifically, the cover 31 is provided with the above-described top portion 310, an upper circumferential wall portion 311 that suspends from the outer circumference of the top portion 310, and the above-described upper flange portion 312 that extends outward from the lower end of the upper circumferential wall portion 311.

The top portion 310 is formed in a roughly rectangular shape in planar view to correspond to the open part of the tray 30.

The battery pack 1 is provided with a cooling fan F for cooling, i.e., for releasing the heat generated by the charge and discharge of the cell modules 2, . . . (cf., FIGS. 1 and 2).

The cooling fan F is mounted to the top portion 310. In association with this, an air intake opening Ha and an exhaust opening Hb are formed in the top portion 310 of the cover 31. Because the top portion 310 is formed in a rectangular shape, the air intake opening Ha and the exhaust opening Hb are formed in diagonal positions on the top portion 310. In the battery pack 1, a suction blower is adopted as the cooling fan F. In association with this, in the cover 31, the cooling fan F is mounted in a position corresponding to the exhaust opening Hb.

The upper flange portion 312 extends outward from the whole circumference of the lower end of the upper circumferential wall portion 311. Therefore, as with the lower flange portion 302, the upper flange portion 312 provides an endless annulus. The upper flange portion 312 abuts the lower flange portion 302, with the cover 31 covering an upper opening of the tray 30.

In the upper flange portion 312, there are formed a plurality of screw insertion holes H2, . . . through each of which a male screw member B is to be inserted. In the upper flange portion 312, a plurality of screw insertion holes H2, . . . for insertion of the male screw member B are formed circumferentially at prescribed intervals. That is, in the upper flange portion 312, a plurality of screw insertion holes H2, . . . are formed according to the arrangement of the screw insertion holes H1, . . . of the lower flange portion 302 that abuts the upper flange portion 312. As a result of this, with the lower flange portion 302 and the upper flange portion 312 held in abutment with each other, the screw insertion holes H1, . . . of the lower flange portion 302 and the screw insertion holes H2, . . . of the upper flange portion 312 coincide with each other.

The battery pack 1 is provided with an edge cover 4 that covers from outside the whole surface or substantially the whole surface of the lower flange portion 302 and the upper flange portion 312 that abut each other.

The edge cover 4 is provided with a first section 40 facing the lower flange portion 302, a second section 41 facing the upper flange portion 312, and a connecting portion 42 that connects base ends of the first section 40 and the second section 41 together.

As shown in FIGS. 2 and 3, the edge cover 4 is made up of a plurality of separate pieces. That is, the edge cover 4 is made up of a plurality of separate pieces 4a, 4b, and 4c. The separate pieces 4a, 4b, and 4c are arranged in such a manner as to cover the lower flange portion 302 and the upper flange potion 312 that abut each other, whereby the separate pieces 4a, 4b, and 4c cover the whole circumference of the lower flange portion 302 and the upper flange potion 312 continuously in the circumferential direction.

More specifically, the edge cover 4 is provided with a plurality of separate pieces 4a, . . . (hereinafter referred to as first separate pieces 4a, . . . ) for covering the long-side parts of the lower flange portion 302 and the upper flange potion 312 that abut each other, a plurality of separate pieces 4b, . . . (hereinafter referred to as second separate pieces 4b, . . . ) for covering the short-side parts of the lower flange portion 302 and the upper flange potion 312 that abut each other, and a plurality of separate pieces 4c, . . . (hereinafter referred to as third separate pieces 4c, . . . ) for covering the corner parts of the lower flange portion 302 and the upper flange potion 312 that abut each other. In the battery pack 1 of this embodiment, a stepped portion P is formed in a midway position of one long-side part of the lower flange portion 302 and the upper flange potion 312 that abut each other. For this reason, the first separate piece 4a covering the one long-side part of the lower flange portion 302 and the upper flange potion 312 that abut each other is divided into two parts, with the stepped part P serving as the boundary.

As shown in FIG. 3, each of the first separate pieces 4a, . . . is provided with a first section 40a facing the lower flange portion 302, a second section 41a facing the upper flange potion 312, and a connecting portion 42a that connects the base ends of the first section 40a and the second section 41a together along the total length. Each of the second separate pieces 4b, . . . is provided with a first section 40b facing the lower flange portion 302, a second section 41b facing the upper flange potion 312, and a connecting portion 42b that connects the base ends of the first section 40b and the second section 41b together along the total length. Each of the third separate pieces 4c, . . . is provided with a first section 40c facing the lower flange portion 302, a second section 41c facing the upper flange potion 312, and a connecting portion 42c that connects the base ends of the first section 40c and the second section 41c together along the total length.

The first section 40a and second section 41a of the first separate piece 4a and the first section 40b and second section 41b of the second separate piece 4b are each formed in the shape of a strip plate. Therefore, the connecting portion 42a of the first separate piece 4a connects an end (a base end) in a direction orthogonal to the longitudinal direction (lateral direction) of the first section 40a and an end (a base end) in a direction orthogonal to the longitudinal direction (lateral direction) of the second section 41a along the total length. The connecting portion 42b of the second separate piece 4b connects an end (a base end) in a direction orthogonal to the longitudinal direction (lateral direction) of the first section 40b and an end (a base end) in a direction orthogonal to the longitudinal direction (lateral direction) of the second section 41b along the total length.

In contrast to this, the first section 40c and second section 41c of the third separate piece 4c are formed in the shape of a hook (the shape of the letter L) in planar view. Therefore, the connecting portion 42c of the third separate piece 4c connects a widthwise end (base end) positioned on the outer side of the first section 40c and a widthwise end (base end) positioned on the outer side of the second section 41c along the total length. The third separate pieces 4c, . . . are provided in quantities of four because they are arranged at four corners of the lower flange portion 302 and the upper flange portion 312. However, for two of the four third separate pieces 4c, 4c to be arranged on one-end side in the longitudinal direction of the bottom portion 300, one of the two sides of each of the first section 40c and the second section 41c, which form a hook shape, is formed to be longer than the other.

As described above, the base end of the first section 40 and the base end of the second section 41 are connected by the connecting portion 42, whereby the area between the base end of the first section 40 and the base end of the second section 41 is blocked by the connecting portion 42. Because the longitudinal sectional shape of the connecting portion 42 is a circular arc, the longitudinal section of the edge cover 4 has a roughly U-shape.

Figure 4:
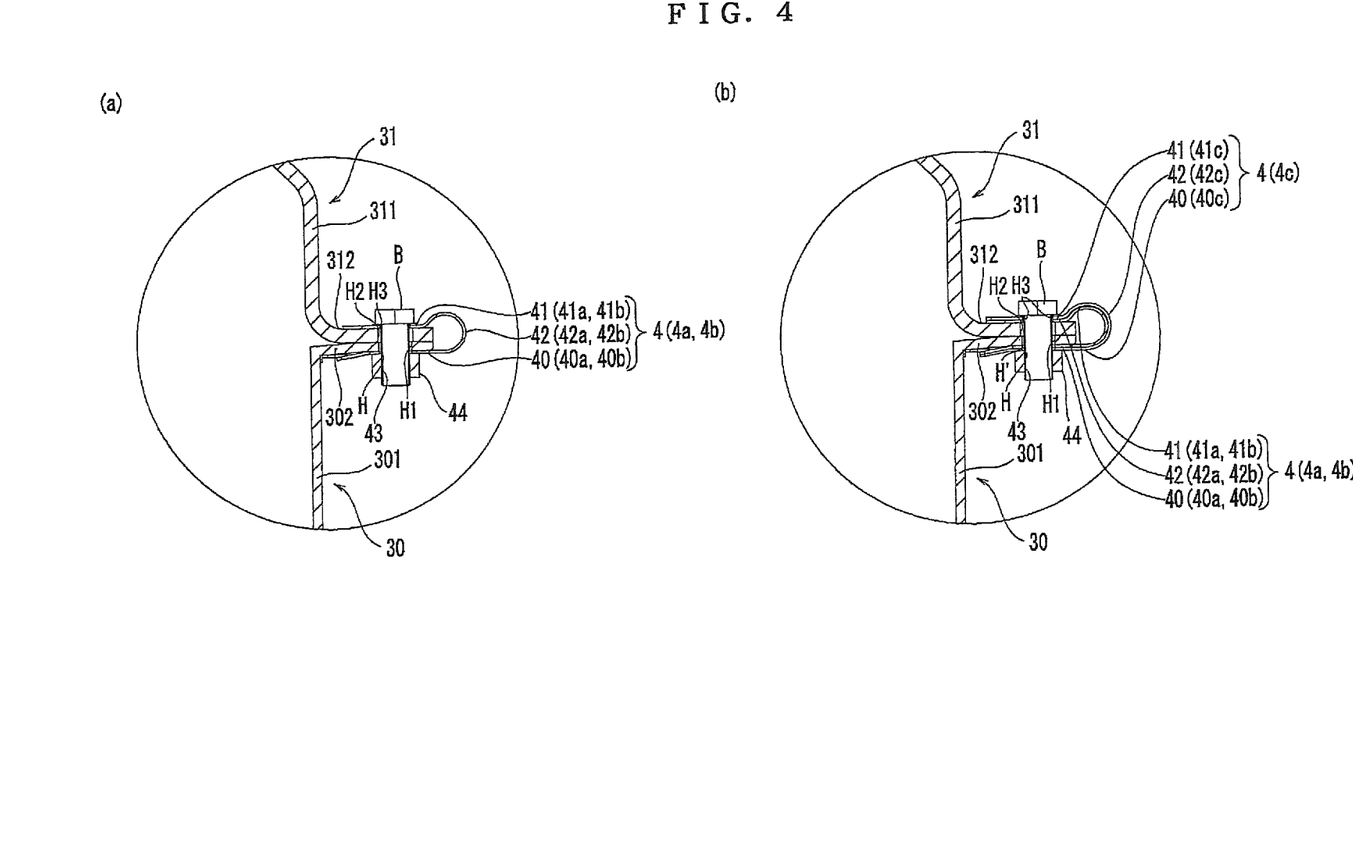

As shown in FIGS. 4A and 4B, the plurality of separate pieces 4a, 4b and 4c are arranged in such a manner that adjacent separate pieces come close to each other or are overlapped with each other when the separate pieces 4a, 4b, and 4c cover the whole circumference of the lower flange portion 302 and the upper flange portion 312 that abut each other. That is, in arranging the first separate pieces 4a, . . . , the second separate pieces 4b, . . . , and the third separate pieces 4c, . . . around the packaging case 3, as shown in FIG. 4B, the separate pieces 4a, 4b, . . . and 4c, . . . are arranged so that the first sections 40c, . . . and second sections 41c, . . . of the third separate pieces 4c, . . . cover from outside longitudinal end portions of each of the first sections 40a, . . . and second sections 41a, . . . of the first separate pieces 4a, . . . and longitudinal end portions of each of the first sections 40b, . . . and second sections 41b, . . . of the second separate pieces 4b . . . .

The two of the first separate pieces 4a, 4a that cover one of the long-side portions of the lower flange portion 302 and the upper flange portion 312 that abut each other are arranged so that the longitudinal end portions of each of the first separate pieces 4a, 4a are close to each other (come into contact with each other), as shown in FIG. 2.

In this edge cover 4, as shown in FIGS. 4(a) and 4(b), in one of the first section 40 and the second section 41, a plurality of female threaded portions 43, . . . are formed in a spaced manner in the circumferential direction of the lower flange portion 302 and the upper flange portion 312, and in the residual one of the first section 40 and the second section 41, there are formed a plurality of screw insertion holes H3, . . . for insertion of the above-described male screw member B according to the arrangement of the female threaded portions 43, . . . . These female threaded portions 43, . . . and screw insertion holes H3, . . . correspond to the arrangement of the screw insertion holes H1 and H2 formed in the lower flange portion 302 and the upper flange portion 312.

In this embodiment, because the edge cover 4 is made up of a plurality of pieces, the female threaded portions 43, . . . are formed in the first section 40a of each of the first separate pieces 4a, . . . , the first section 40b of each of the second separate pieces 4b, . . . , and the first section 40c of each of the third separate pieces 4c, . . . , and the screw insertion holes H3, . . . are formed in the second section 41a of each of the first separate pieces 4a, . . . , the second section 41b of each of the second separate pieces 4b, . . . , and the second section 41c of each of the third separate pieces 4c, . . . .

As described above, in arranging the first separate pieces 4a, . . . , the second separate pieces 4b, . . . , and the third separate pieces 4c around the packaging case 3, the first section 40c and second section 41c of each of the third separate pieces 4c, . . . , cover from outside longitudinal end portions of each of the first section 40a and second section 41a of the first separate piece 4a and longitudinal end portions of each of the first section 40b and second section 41b of the second separate piece 4b. For this reason, the end portions of the first separate piece 4a covered with the third separate piece 4c and the end portions of the second separate piece 4b covered with the third separate piece 4c are not provided with a female threaded portion 43, but merely provided with a through hole H' that is formed concentrically with the screw insertion hole H3 (cf., FIG. 3).

The female threaded portion 43 is composed of a threaded hole of a nut 44. That is, in the first section 40, the nuts 44, . . . are fixed (welded) onto an outer surface located opposite to the surface facing the lower flange portion 302 and the threaded holes of the nuts 44, . . . constitute the female threaded portions 43, . . . . In association with this, the first section 40 is provided with through holes H, corresponding to the threaded holes of the nuts 44, . . . . Since a typical nut is adopted as the nut 44 in this embodiment, the female threaded portion 43 is open at both ends thereof.

The battery pack 1 of the present embodiment is as described above. Next, the assembly of this battery pack 1 will be described.

First, the cell modules 2, . . . , and the controller 305 are arranged on the tray 30. And the open portion over the tray 30 is covered with the cover 31, and the upper flange portion 312 of the cover 31 abuts the lower flange portion 302 of the tray 30. In the present embodiment, a sealing agent is applied to the top surface of the lower flange portion 302 before the open portion of the tray 30 is covered by the cover 31 (before the lower flange portion 302 and the upper flange portion 312 abut each other).

As described above, after the tray 30 is covered with the cover 31, the edge cover 4 is attached to the lower flange portion 302 and the upper flange portion 312 that abut each other. That is, as shown in FIGS. 4A and 4B, the edge cover 4 is placed on the lower flange portion 302 and the upper flange portion 312 that abut each other so that the screw insertion hole H3 of the edge cover 4 coincides with the screw insertion holes H1 and H2 of the lower flange portion 302 and the upper flange portion 312. The male screw member B is inserted into the screw insertion holes H1, H2, and H3 formed in the second section 41, the lower flange portion 302, and the upper flange portion 312, and this male screw member B is screwed into the female threaded portion 43 formed in the first section 40.

As a result of this, the lower flange portion 302 and the upper flange portion 312 are held between the first section 40 and second section 41 of the edge cover 4 and fastened together while in contact with each other.

And the battery pack 1 with the liquid-tight internal space housing the cell modules 2, . . . is completed. The completed battery pack 1 is fixed to the car body (chassis). The mounting of the cooling fan F, connectors, etc. and the connection of a wiring system are performed before the mounting of the battery pack 1 to the car body (the chassis) 1, and are performed before or after the tray 30 is covered with the cover 3.

The battery pack 1 of the present embodiment is as described above, and according to the configuration, water does not enter between the lower flange portion 302 and the upper flange portion 312 even if liquid, such as water and wash fluid (hereinafter, collectively and simply referred to as liquid), is attached to the packaging case 3 due to splashing of water during driving or due to car washing.

Figure 5:
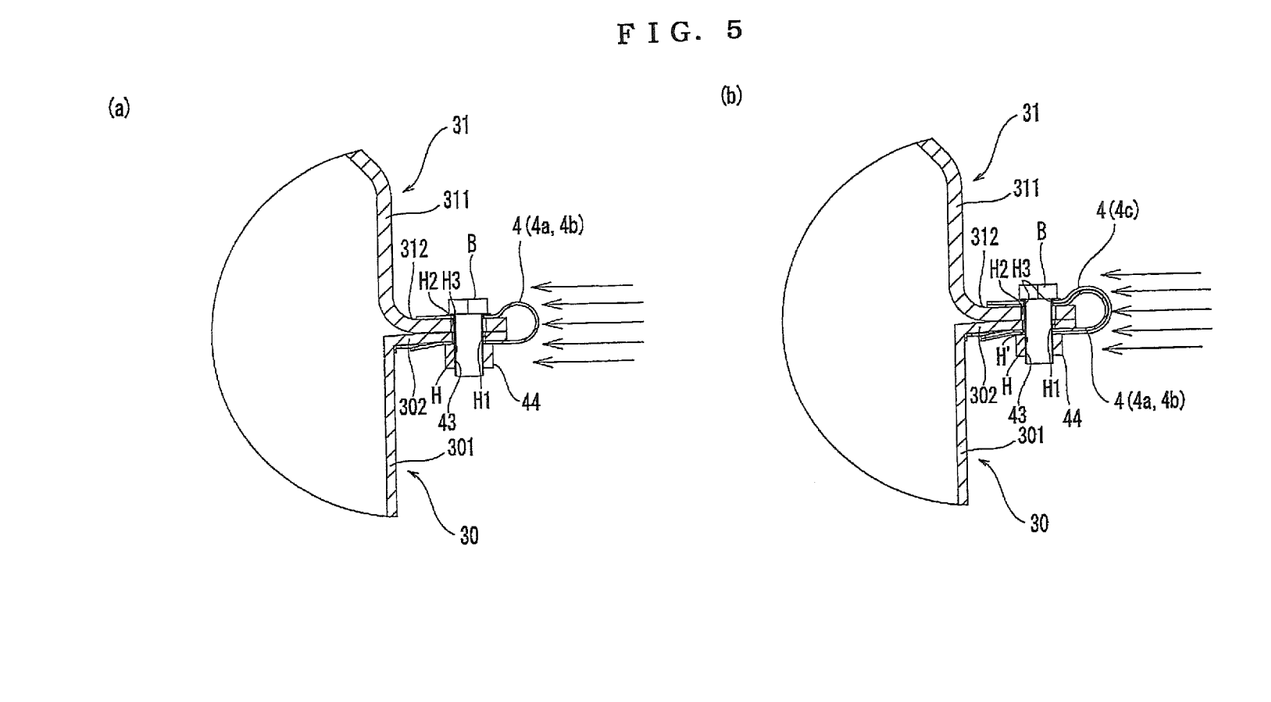

More specifically, as shown in FIGS. 5(a) and 5(b), even if liquid is sprayed to a connection portion of the cover 31 and the tray 30 (near the lower flange portion 302 and the upper flange portion 312 abutting each other) due to car washing and the like, the edge cover 4 blocks the advance of the liquid (advance to the interface between the lower flange portion 302 and the upper flange portion 312 that abut each other). As a result of this, even if high-pressure liquid is sprayed, the entry of the liquid to the internal space from between the lower flange portion 302 and the upper flange portion 312 can be positively prevented.

Although a large amount of liquid (water) is attached to the packaging case 3 due to the spray of high-pressure liquid, the splash of water during driving, and the like, the liquid is attached in natural conditions. For this reason, the liquid does not enter between the edge cover 4 and the lower flange portion 302 or between the edge cover 4 and the upper flange portion 312. And even if the liquid enters between them, the liquid does not enter between the lower flange portion 302 and the upper flange portion 312. That is, unlike the liquid ejected from the high-pressure washer, there is no action of high pressure from the liquid (water) attached to the packaging case 3, and the liquid does not enter between the lower flange portion 302 and the upper flange portion 312.

And the sealing agent interposed between the lower flange portion 302 and the upper flange portion 312 also increases the liquid-tightness between the lower flange portion 302 and the upper flange portion 312. As a result of this, the entry of liquid between the lower flange portion 302 and the upper flange portion 312 is more positively prevented. Furthermore, the lower flange portion 302 and the upper flange portion 312 abutting each other are covered by the edge cover 4. For this reason, even if the sealing agent interposed between the lower flange portion 302 and the upper flange portion 312 has fluidity, complete outflow of the sealing agent from between the lower flange portion 302 and the upper flange portion 312 to the outside can be prevented. Therefore, the sealing property (liquid-tightness) between the lower flange portion 302 and the upper flange portion 312 can be positively maintained.

The edge cover 4 is provided with the first section 40 facing the lower flange portion 302, the second section 41 facing the upper flange portion 312, and the connecting portion 42 that connects the base ends of the first section 40 and the second section 41 along the total length. And the plurality of female threaded portions 43, . . . are formed on the first section 40 at intervals in the circumferential direction of the lower flange portion 302 and the upper flange portion 312, and the screw insertion holes H1, H2, and H3 for causing the male screw members B to be inserted according to the arrangement of the female threaded portions 43, . . . are pierced in the upper flange portion 312, the lower flange portion 302, and the second section 41. For this reason, the lower flange portion 302 and the upper flange portion 312 are interposed between the first section 40 and the second section 41 so that the female threaded portions 43 coincide with the screw insertion holes H1 and H2 of the lower flange portion 302 and the upper flange portion 312, the male screw members B are inserted into the screw insertion holes H1, H2, and H3 pierced in the second section 41, the lower flange portion 302, and the upper flange portion 312, respectively, and the male screw members B are screwed into the female threaded portions 43. In this way, the lower flange portion 302 and the upper flange portion 312 are held between the first section 40 and the second section 41 of the edge cover 4 and are fastened with the surfaces being in contact with each other.

According to the battery pack 1 with the configuration described above, the cover 31 can be mounted on the tray 30 just by inserting the male screw members B into the screw insertion holes H1, H2, and H3 to screw the male screw members B into the female threaded portions 43. Particularly, in the present embodiment, the nuts 44, . . . are welded on the outer surface on the opposite side of the surface facing the lower flange portion 302 of the first section 40, and the screw holes of the nuts 44, . . . serve as the female threaded portions 43, . . . . For this reason, the male screw members B, . . . can be securely screwed into the nuts 44, . . . (female threaded portions 43, . . . ), and the tightening force by the male screw members B, . . . in the direction of axis line can be increased.

And the increase in the tightening force in the direction of axis line can increase the force of holding the lower flange portion 302 and the upper flange portion 312 by the first section 40 and the second section 41 of the edge cover 4. For this reason, the surface contact of the lower flange portion 302 and the upper flange portion 312 can be more securely realized, and the liquid-tightness between the lower flange portion 302 and the upper flange portion 312 can be increased. In the present embodiment, as described above, since the sealing agent is interposed between the lower flange portion 302 and the upper flange portion 312, the liquid-tightness between the lower flange portion 302 and the upper flange portion 312 can be more securely increased.

And in the present embodiment, the nuts 44, . . . are integral with the edge cover 4. For this reason, after the removal of the male screw members B, . . . , the nuts do not have to be recovered as in the past.

Therefore, the entry of the liquid, such as water and wash fluid, attached to the outer surface of the packaging case 3 into the internal space of the packaging case 3 from between the tray 30 and the cover 31 can be securely prevented, and furthermore, the attachment and detachment work of the cover 31 to and from the tray 30 can be easily performed.

The battery pack of the present invention is not limited to the above-described embodiment and can be appropriately changed so long as the changes do not deviate from the gist of the present invention.

That is, although in the above-described embodiment the description was given of the battery pack 1 mounted on an electric vehicle (EV), the present invention is not limited to this. The battery pack of the present invention may also be a battery pack to be mounted on a hybrid electric vehicle (HEV). In other words, all that is needed is that the battery pack of the present invention is adopted as the power source (energy source) of an electrically powered vehicle that is driven by electric energy.

In the above-described embodiment, the description was given of the battery pack 1 in which the packaging case 3 houses a plurality of cell modules 2, . . . , each of which is formed of a plurality of electric cells. However, the present invention is not limited to this configuration. For example, electric cells that are not packaged may be housed in the packaging case 3. In other words, the present invention can be applied to a battery pack in which one or more electric cells are housed in a packaging case 3.

Although in the above-described embodiment the edge cover 4 is made up of the first separate pieces 4a, . . . , the second separate pieces 4b, . . . , and the third separate pieces 4c, . . . , the present invention is not limited to this configuration. The edge cover 4 may be made up of two separate pieces each provided with the first section 40, the second section 41, and the connecting portion 42. Alternatively the edge cover 4 may be made up of a single piece provided with the first section 40, the second section 41, and the connecting portion 42.

However, because it is necessary that the edge cover 4 cover the whole circumference of the lower flange portion 302 and the upper flange portion 312, in the case of the configuration in which an edge cover with a single piece is used, it is necessary to divide the single-piece edge cover at a given position. In this case, it is preferred that flexibility be given to the edge cover 4 in a position different from the position where the edge cover 4 is divided or that a hinge structure be provided in a position different from the position where the edge cover 4 is divided. By doing this, it is possible to widen the spacing of both ends of the edge cover 4, with the portion to which flexibility is given or the hinge structure serving as a supporting point. For this reason, it is possible to easily arrange the edge cover 4 along the whole circumference of the lower flange portion 302 and the upper flange portion 312.

In the above-described embodiment, although the sealing agent is interposed between the lower flange portion 302 and the upper flange portion 312, the configuration is not limited to this. For example, the bottom surface of the upper flange portion 312 and the top surface of the lower flange portion 302 may come into direct surface contact with each other. Even in this way, the tightening action of the male screw members B can attain the liquid-tightness between the lower flange portion 302 and the upper flange portion 312. However, to further increase the liquid-tightness, it is preferred that the sealing agent be interposed between the lower flange portion 302 and the upper flange portion 312 as in the embodiment described above.

Although in the above-described embodiment the female threaded portions 43, . . . are formed in the first section 40 of the edge cover 4 and the screw insertion holes H3, . . . are formed in the second section 41 of the edge cover 4, the present invention is not limited to this configuration. For example, it is possible to adopt the configuration in which the screw insertion holes H3, . . . are formed in the first section 40 of the edge cover 4 and the female threaded portions 43, . . . are formed in the second section 41 of the edge cover 4.

Although in the above-described embodiment the nuts 44, . . . are fixed (welded) to the first section 40 and the threaded holes of the nuts 44, . . . form the female threaded portions 43, . . . , the present invention is not limited to this configuration. For example, threaded holes (tap holes) may be formed directly in the first section 40. The same applies also to the case where the female threaded portions 43, . . . are formed in the second section 41.

Although in the above-described embodiment the description was given of the packaging case 3 in which the bottom portion 300 of the tray 30 has a rectangular shape and the top portion 310 of the cover 31 has a rectangular shape in such a manner as to correspond to this, the present invention is not limited to this configuration. For example, it is possible to adopt the configuration in which the bottom portion 300 of the tray 30 has a square shape and also the top portion 310 of the cover 31 has a square shape in such a manner as to correspond to this. Furthermore, the present invention is not limited to the configurations in which the bottom portion 300 of the tray 30 and the top portion 310 of the cover 31 form angular shapes such as a rectangular and a square shape, and the bottom portion 300 and the top portion 310 may have non-rectangular shapes.

Although in the above-described embodiment the internal space of the packaging case 3 is partitioned, the present invention is not limited to this configuration. It is also possible to adopt the configuration in which the internal space of the packaging case 3 is not partitioned. Furthermore, the present invention is not limited to the configuration in which the controller 305 is arranged in the packaging case 3, and it is possible to adopt the configuration in which only the cell modules 2, . . . are arranged in the packaging case 3 and the controller 305 and others are arranged in another case.

Although in the above-described embodiment the description was given of the packaging case 3 that is composed of the tray 30 in which the lower flange portion 302 is provided in a coupled manner at the upper end of the lower circumferential wall portion 301 rising from the outer circumference of the bottom portion 300, and the cover 31 in which the upper flange portion 312 is provided in a coupled manner at the lower end of the upper circumferential wall portion 311 suspending from the outer circumference of the top portion 310, the packaging case 3 is not limited to this. For example, it is possible to adopt a cover 31 forming a plate shape as a whole in which the upper flange portion 312 is provided in a coupled manner directly on the outer circumference of the top portion 310 on the precondition that the tray 30 is of the same configuration as in the above-described embodiment. Alternatively it is possible to adopt a tray 30 forming a plate shape as a whole in which the lower flange portion 302 is provided in a coupled manner directly on the outer circumference of the bottom portion 300 on the precondition that the cover 31 is of the same configuration as in the above-described embodiment.

That is, all that is needed is that the space housing the cell modules 2, . . . is formed in at least one of the tray 30 and the cover 31. Even by doing this, the edge cover 4 covers the whole circumference or substantially the whole circumference of the lower flange portion 302 or the upper flange portion 312 that abut each other, whereby the same operation and effect as in the above-described embodiment can be ensured.

Although in the above-described embodiment the female threaded portions 43, . . . are open at both ends thereof, the present invention is not limited to this configuration. For example, the female threaded portions 43, . . . may be closed at one ends thereof located on the opposite side to the surface facing the lower flange portion 302 in the first section 40. Specifically, in the case where the nuts 44, . . . are fixed to the first section 40 and the threaded holes of the nuts 44, . . . form the female threaded portions 43, cap nuts are adopted as the nuts 44, . . . . Alternatively, in the case where the female threaded portion 43 is formed directly in the first section 40, non-through holes are formed in the first section 40 and female threads are formed on the inner circumference (tapping). The same applies also to the case where the female threaded portion 43 is provided in the second section 41 in place of the first section 40.

By doing this, it is possible to prevent a liquid from entering the interface between the female threaded portion 43 and the male screw member B (between the threads) from the side opposite to the opening from which the male screw member B is inserted and engaged with the female threaded portion 43. That is, because the female threaded portion 43 is closed at the outside, it is possible to reliably prevent a liquid adhering to the vicinity of the female threaded portion 43 in one of the first section 40 and the second section 41 from entering the female threaded portion 43. As a result of this, it is possible to more reliably seal the interface between lower flange portion 302 and the upper flange portion 312.

Although in the above-described embodiment the description was given of the battery pack 1 mounted to the bottom portion of an electrically powered vehicle, the present invention is not limited to this configuration. For example, the present invention may be applied also to a battery pack 1 that can be mounted or is mounted to portions other than the bottom portion of an electrically powered vehicle to which liquids such as rainwater and cleaning water may adhere. The shape and arrangement of the connecting arm 303 can be appropriately changed as necessary depending on the type of the electrically powered vehicles.

Although in the above-described embodiment the plurality of female threaded portions 43, . . . are arranged in the edge cover 4 in a line circumferentially at prescribed intervals, the present invention is not limited to this configuration. For example, a plurality of female threaded portions 43, . . . may be arranged in a plurality of lines in a direction orthogonal to the circumferential direction. In this case, a plurality of screw insertion holes H1, H2, and H3 are formed in the lower flange portion 302, the upper flange portion 312, and the second section 41 in such a manner as to correspond to the arrangement of the female threaded portions 43, . . . .

REFERENCE SIGNS LIST

1 . . . battery pack, 2 . . . cell module, 3 . . . packaging case, 4 . . . edge cover, 4*a* . . . first separate piece (separate piece), 4*b* . . . second separate piece (separate piece), 4*c* . . . third separate piece (separate piece), 30 . . . tray, 31 . . . cover, 40 . . . first section, 41 . . . second section, 42 . . . connecting portion, 43 . . . female threaded portion, 44 . . . nut, 300 . . . bottom portion, 301 . . . lower circumferential wall portion, 302 . . . lower flange portion, 303 . . . connecting arm, 304 . . . partition, 305 . . . controller, 310 . . . top portion, 311 . . . upper circumferential wall portion, 312 . . . upper flange portion, A1, A2, A3, A4 . . . regions, F . . . cooling fan, H, H' . . . through holes, Ha . . . connector through hole, H1, H2, H3 . . . screw insertion holes, B . . . male screw member, Ha . . . air intake opening, Hb . . . exhaust opening, P . . . stepped portion

The invention claimed is:

1. A battery pack comprising:
   one or more electric cells; and
   a packaging case that houses the one or more electric cells, the packaging case including:
   a tray on which the electric cells are arranged, the tray having a lower flange portion;
   a cover that covers the electric cells on the tray, the cover having an upper flange portion, wherein the lower flange portion and the upper flange portion abut each other and the electric cells on the tray are covered with the cover; and
   an edge cover that covers, from an outside, the whole circumference or substantially the whole circumference of the lower flange portion and the upper flange portion abutting each other,
   the edge cover including:
   a first section facing the lower flange portion;
   a second section facing the upper flange portion; and
   a connecting portion for connecting base ends of the first section and the second section, wherein
   a plurality of female threaded portions are arranged on one of the first section and the second section, and
   screw insertion holes are formed on the lower flange portion, on the upper flange portion, and on the other of the first section and the second section, for causing male screw members to be inserted according to the arrangement of the female threaded portions.

2. The battery pack according to claim 1, wherein nuts are fixed onto an outer surface of either of the first section or the second section on the side opposite to a surface which faces the lower flange portion or the upper flange portion and the plurality of female threaded portions are each formed by a threaded hole of each of the nuts.

3. The battery pack according to claim 1, wherein a sealing agent is interposed between the lower flange portion and the upper flange portion.

4. The battery pack according to claim 1, wherein the plurality of female threaded portions each are formed in the form of a non-through hole in such a manner as to be blocked on the side opposite to a surface of either the first section or the second section which faces the lower flange portion or the upper flange portion.

5. The battery pack according to claim 1, wherein the lower flange portion and the upper flange portion are in the shape of an angular frame in planar view, and the edge cover is divided into a first separate piece that covers side parts of the lower flange portion and the upper flange portion and a second separate piece that covers corner portions of the lower flange portion and the upper flange portion.

6. The battery pack according to claim 5, wherein first and second adjacent separate pieces are arranged so that end portions are close to each other or abut each other.

7. The battery pack according to claim 6, wherein the first and second adjacent separate pieces are arranged so that the first section and the second section of one of the first and second separate pieces cover end portions of the first section and the second section of the other of the first and second separate pieces from the outside.

8. The battery pack according to claim 1, wherein the packaging case is configured to be capable of being mounted to a bottom portion of an electrically powered vehicle or is mounted thereto.

9. An electrically powered vehicle including the battery pack according to claim 1.

10. The battery pack according to claim 2, wherein the nuts are fixed onto an outer surface located opposite to the surface facing the lower flange portion.

11. The battery pack according to claim 1, wherein the lower flange portion and the upper flange portion are held with the surfaces being in contact with each other.

12. The battery pack according to claim 5, wherein the first section and the second section of the second piece that covers the corner portions of the lower flange portion and the upper flange portion are formed in the shape of the letter L.

13. The battery pack according to claim 5, wherein one of the first section and the second section of the second separate piece that covers the corner portions of the lower flange portion and the upper flange portion is formed to be longer than the other of the first section and the second section. might be set to 50%) is large enough then N may be adaptively adjusted to 1 or 2.

\* \* \* \* \*